US005483250A

United States Patent [19]
Herrick

[11] Patent Number: 5,483,250
[45] Date of Patent: Jan. 9, 1996

[54] PROJECTION DISPLAY SYSTEM FOR A LAPTOP COMPUTER OR A NOTEBOOK COMPUTER

[75] Inventor: Gregory E. Herrick, Minneapolis, Minn.

[73] Assignee: Zeos International, Inc., New Brighton, Minn.

[21] Appl. No.: 691,531

[22] Filed: Apr. 25, 1991

[51] Int. Cl.⁶ ...................................... G09G 3/20
[52] U.S. Cl. .......................................... 345/32
[58] Field of Search ..................... 340/705, 784; 364/708; 361/380, 681; 353/39, 74; 312/7.2; 359/443; 345/32

[56] References Cited

U.S. PATENT DOCUMENTS

| | | | |
|---|---|---|---|
| 3,801,199 | 4/1974 | Kaye | 353/74 |
| 3,872,462 | 3/1975 | Lemelson | 340/705 |
| 4,589,659 | 5/1986 | Yokoi et al. | 340/784 X |
| 4,803,652 | 2/1989 | Maeser et al. | 364/708 |
| 4,809,078 | 2/1989 | Yobe et al. | 340/748 X |
| 5,060,152 | 10/1991 | Maeser et al. | 364/708 X |
| 5,091,873 | 2/1992 | Araki | 364/708 |

FOREIGN PATENT DOCUMENTS

1179147  7/1957  France ................................. 358/254

*Primary Examiner*—Jeffery Brier
*Attorney, Agent, or Firm*—Hugh D. Jaeger

[57] ABSTRACT

A projection display system for a laptop computer or notebook computer for projection of a display of stored information on a flexible screen attached to or adjacent to the computer or any surface adjacent to the computer. A display screen can be attached to the laptop computer or notebook computer or adjacent to the laptop computer or notebook computer.

5 Claims, 8 Drawing Sheets

PROJECTION DISPLAY SYSTEM FOR A LAPTOP COMPUTER OR A NOTEBOOK COMPUTER

BACKGROUND OF THE INVENTION

1. Field of the Invention

The present invention pertains to a display for computers, and more particularly, pertains to a projection display for laptop computers or notebook computers.

2. Description of the Prior Art

Laptop computers or notebook computers usually utilize an LCD display. The LCD displays associated with laptop computers or notebook computers are fragile. All of these displays add weight to the computer, are electronic, and require a finite amount of space, as well as considerable power.

The LCD displays for laptop or notebook computers add weight, require energy, and require an electrical connection to the laptop computer or notebook computer.

The present invention overcomes the disadvantages of the prior art by providing a projection display which projects the stored information as a video graphic or printed image onto an adjacent surface, whether it be a flat planar screen, a rolled screen or a suitable screen surface for displaying the stored information.

SUMMARY OF THE INVENTION

The general purpose of the present invention is a video projection system for projecting processed or stored information onto a screen, such as a video screen, such as for laptop computers or notebook computers.

According to one embodiment of the present invention, there is provided a laptop computer or notebook computer including a projection system within the laptop computer or notebook computer for projecting processed or stored information onto a video screen. The video screen can be a hinged, flat planar screen on the computer, a rolled screen on the computer, or a surface adjacent to the laptop computer or notebook computer for display of the processed information as a displayed video image.

Significant aspects and features of the present invention include a display for projecting stored information from a laptop computer or notebook computer onto a screen, such as a rolled up screen or a flat screen attached to the laptop computer or notebook computer. A number of options are included. In one option, the screen could also be placed adjacent to the laptop computer or the notebook computer.

Several other options relate to achieving a high-quality image on the screen, and to establishing and maintaining the optimum positional relationship between projection system and screen.

Another optional feature is a mechanical or electronic coupling of screen and projection system in order to preserve the critical positional relationship for which the corrective lens was designed.

Another series of options relates to convenience and protected storage of the screen when the computer system is in its carry mode. One of these simply provides a slot in the computer case to receive the screen for storage.

Yet another screen-hinge option places the projection surface against the computer case and hence in a protected position.

Yet another option arises because the screen may on occasion require some shrouding, or protection from high ambient-light levels, as in outdoor daylight use of the computer. One way to achieve this shrouding is to employ the sides of the computer case, or members fitting inside or outside the sides of the computer case.

Having thus described the embodiments of the present invention, it is the principal object hereof to provide a computer, such as a laptop computer or notebook computer, with a display screen used with a projection system for projecting processed or stored information onto the screen.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
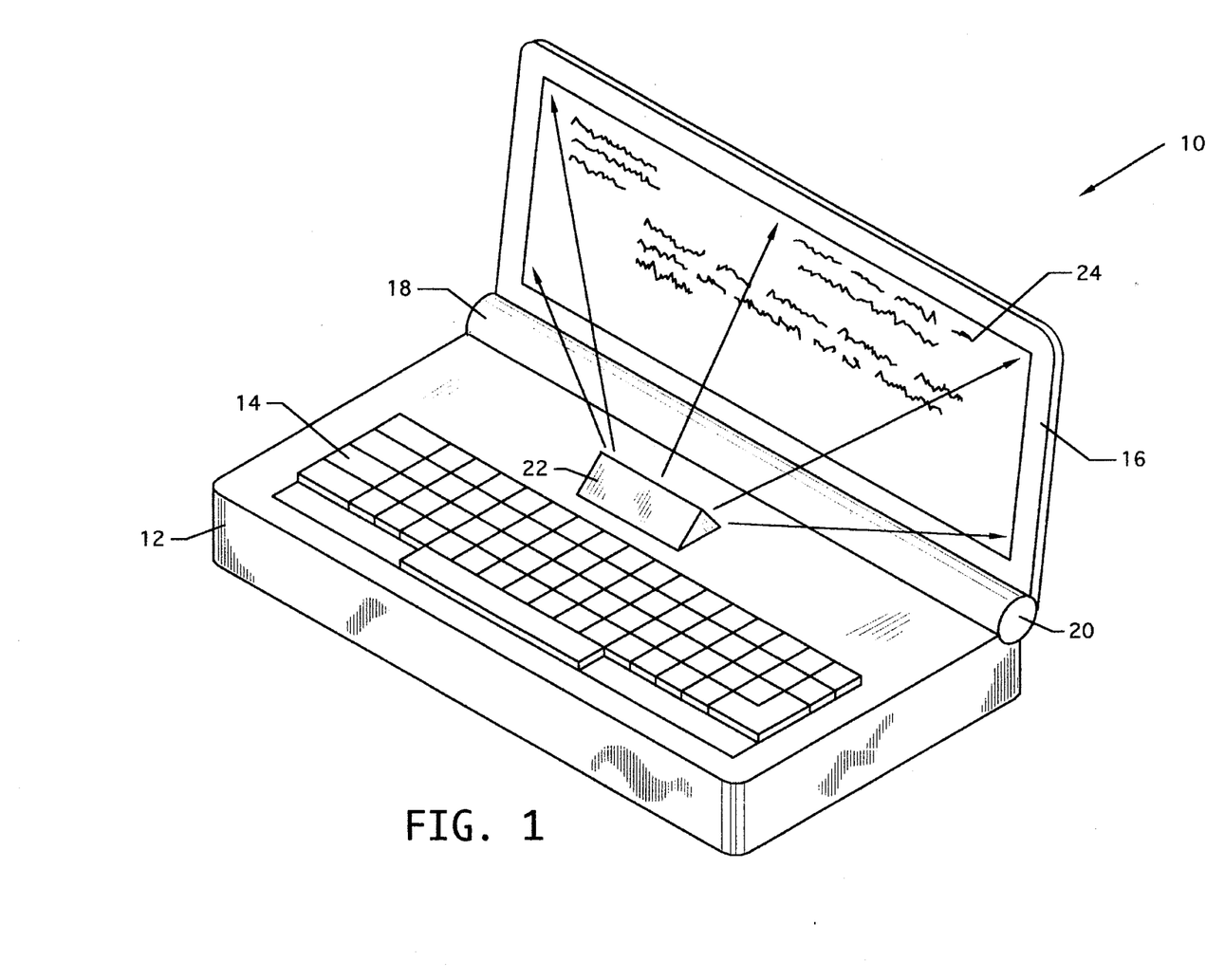
FIG. 1 illustrates a perspective view of a notebook computer with the projection display system.

FIG. 1 illustrates a perspective view of a notebook computer 10. The notebook computer 10 includes a housing 12 supporting a keyboard 14. Attached to the housing 12 is a hinged, foldable screen and cover 16 which pivots on respective ends 18 and 20 of the housing 12. A projection system 22 positions in the housing 12 and projects processed information onto a screen 24. The projection system 22 is similar to that utilized in big screen televisions and microminiaturized for a laptop computer or notebook computer, and similar in electrooptical structure to hand-held microminiature televisions. The projection display screen 24 is light weight, consumes less energy, and is not as mechanically and. electrooptically sensitive as LCD displays. The projection system 22 also allows for display of processed or stored information on a real time basis. The projection display system 22 is not temperature sensitive and provides for accurate visual display of the processed or stored information, free of the limitations of the prior art LCD displays.

MODE OF OPERATION

Figure 2:
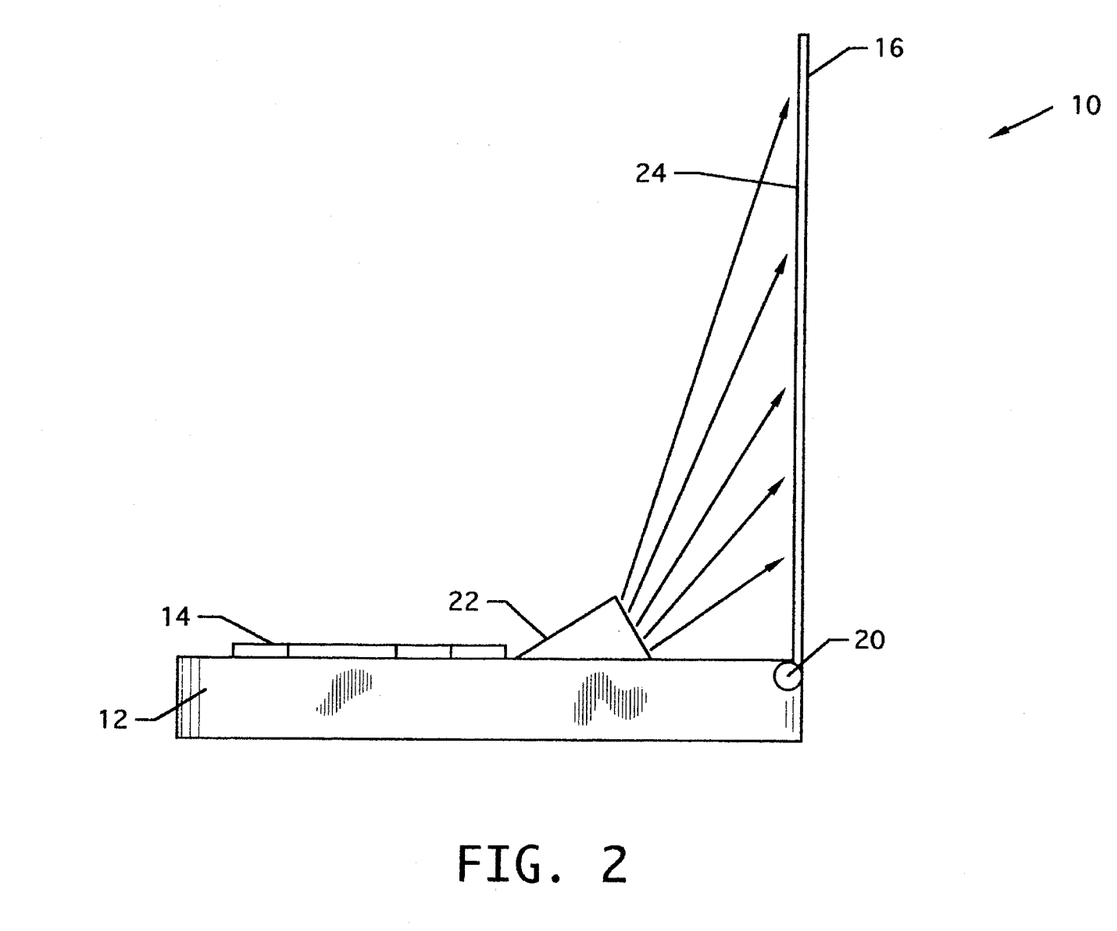
FIG. 2 illustrates a side view of a notebook computer with the projection display system.

FIG. 2 illustrates a side view of a notebook computer 10 with the projection display system 22 projecting against the screen 24.

Figure 3:
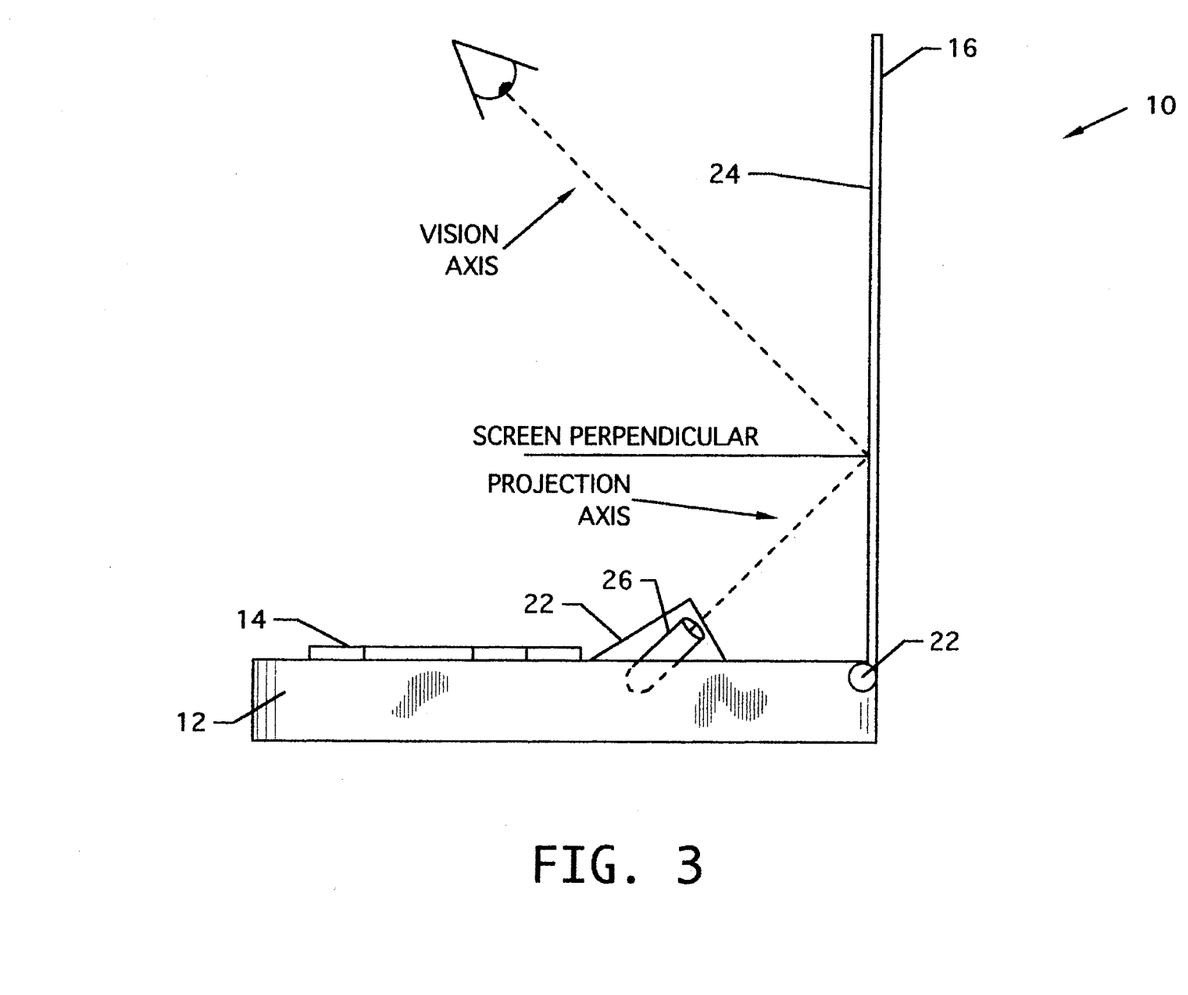
FIG. 3 illustrates a side view of the computer in its operating configuration.

FIG. 3 illustrates a side view of the computer 10 in its operating configuration where all numerals correspond to those elements previously described. In a small computer of the invention employing a projected-on-a-screen display, the angle between the projection and vision axis will be relatively large, as compared to other familiar cases, such as an ordinary motion-pickup projection system. In one option, therefore, a corrective lens 26 is provided on the projection system to accomplish two results: (1) to eliminate the keystone effect that would otherwise exist (image wider at top than at bottom), and (2) to achieve sharp imaging top and bottom in view of differing screen-to-projector distance at top and bottom.

Another optional feature is a mechanical or electronic coupling of screen and projection system in order to preserve the critical positional relationship for which the corrective lens was designed. Some flexibility in the screen's angular positions will be desired in order to adjust the computer according to the user's stature, according to the user's seating arrangement, which can vary from time to time, and according to the computer support system (e.g., lap or table), which is also a variable. In this case, the coupling of screen and projection system comes into play.

Figure 4:
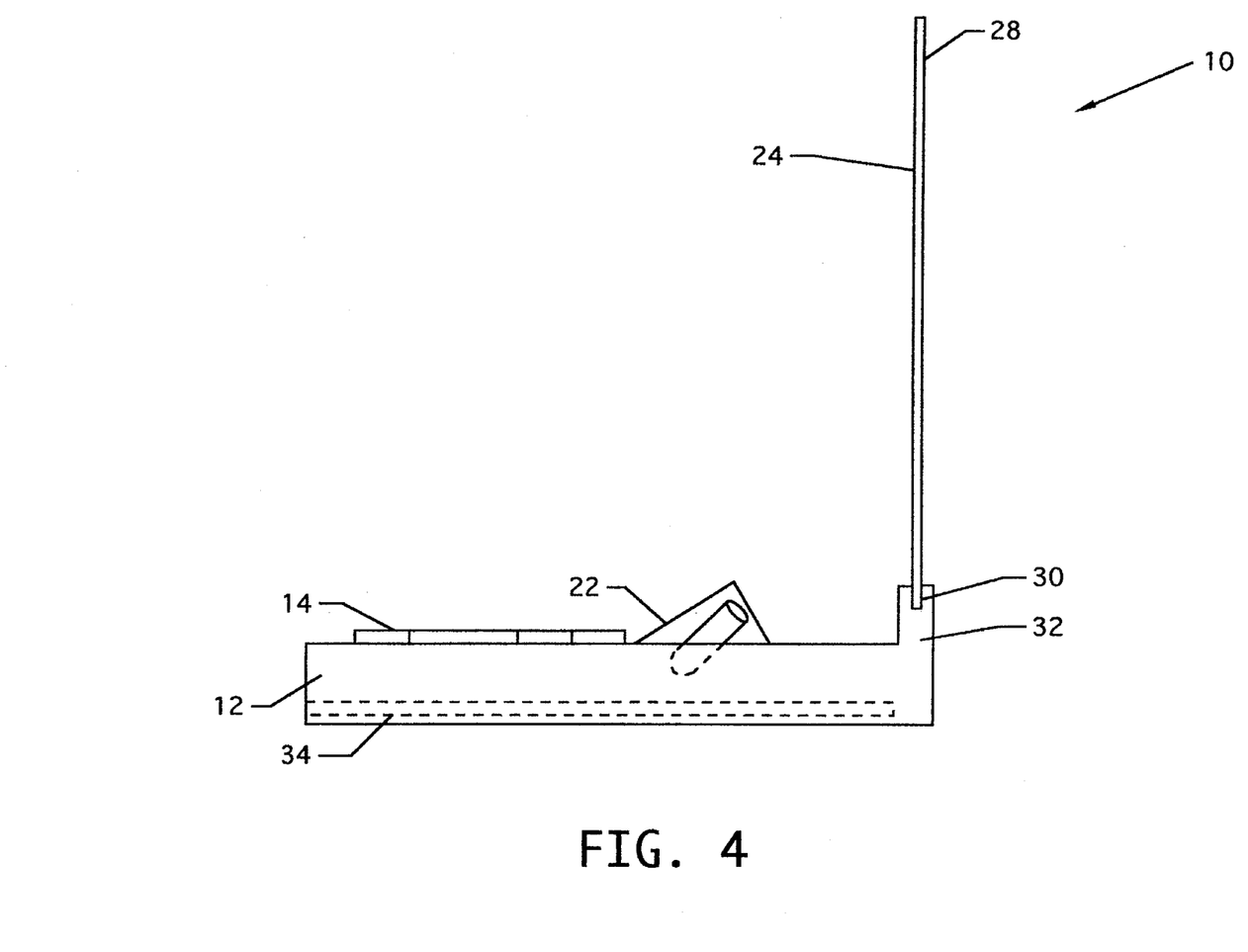
FIG. 4 illustrates a side view of the computer including slot for receiving screen for storage.

FIG. 4 illustrates a side view of the computer 10 where all numerals correspond to those elements previously described. A removable screen support member 28 aligns in and frictionally engages a receiving slot 30 in an integral bracket 32 at the rear of the housing 12. A storage slot 34 aligns horizontally in the lower region of the housing 12 and accommodates the screen support member 28, which disengages from the receiving slot 30 for self storage. The screen support member 28 itself is made of a lightweight, but stable material, such as hard aluminum, which unlike soft aluminum is resistant to bending. It can be made of thin-gauge material for further lightness, and can carry a matte white coating on its projection side. If necessary, a heavier gauge (but still light weight) stiffening frame (typically a "picture frame" with cross members) can be attached to the rear of the thin screen 24 by using a nondistorting means, such as the metal-to-metal cement employed extensively in aircraft assembly. Design freedom in horizontal screen positioning may be desired, because having the screen farther from the user diminishes the aforementioned angle between the vision and projection axes. Such freedom can be achieved through the hinged-holder arrangement depicted in FIG. 5.

Figure 5:
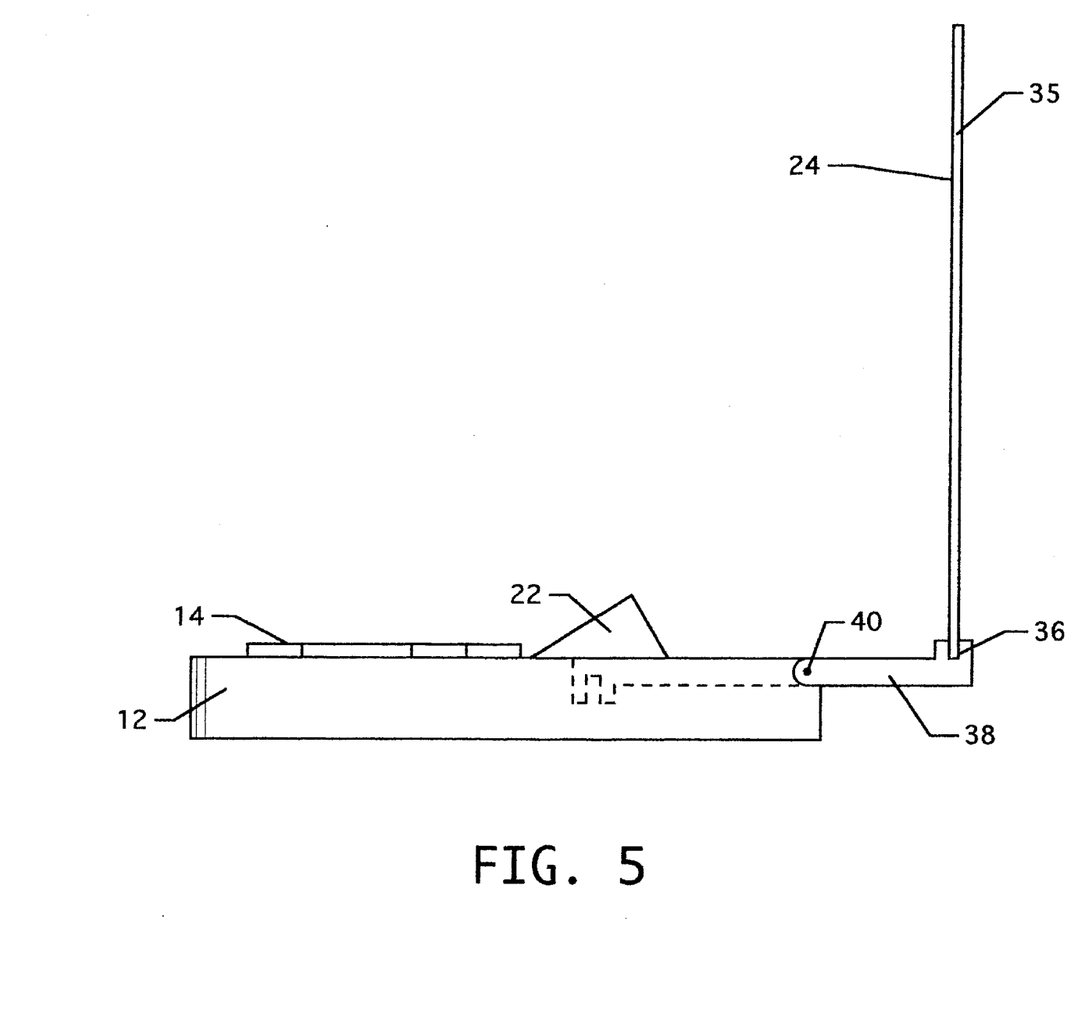
FIG. 5 illustrates a hinged holder arrangement.

FIG. 5 illustrates a hinged-holder arrangement where all numerals correspond to those elements previously described. The deployed screen configuration is shown with solid lines, and the stored configuration, with dashed lines. A removable screen support member 35 aligns in and frictionally engages a receiving slot 36 in a hinged bracket 38. The hinged bracket 38 pivots about a pivot point 40 and stores in recesses in the upper portion of the housing 12 as illustrated by dashed lines. The screen support member 35, which is manually disengaged from the receiving slot, is stored elsewhere, such as in storage slot 34 in FIG. 4 or in other areas according to the teachings of embodiments contained herein.

Figure 6:
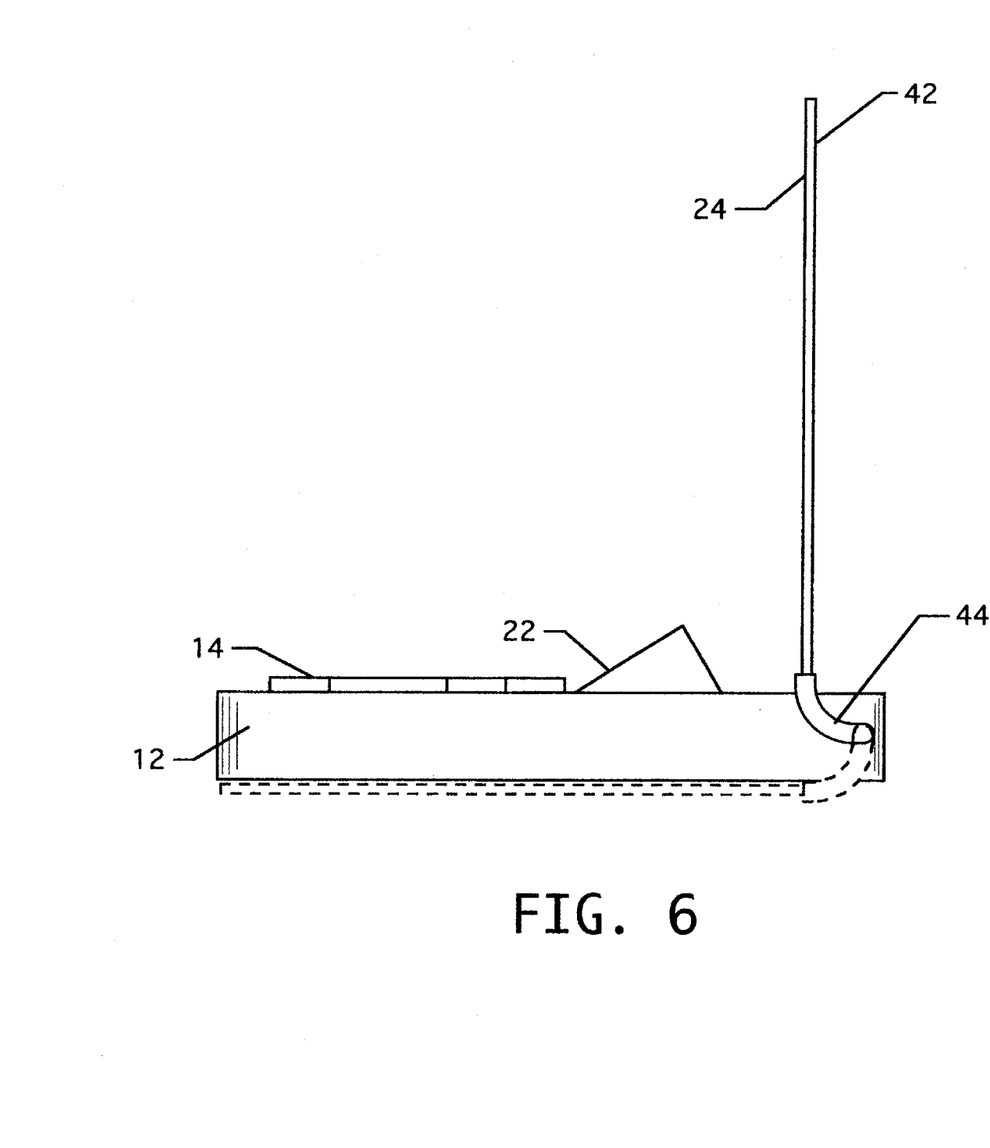
FIG. 6 illustrates a side view of the system including a hinged screen arrangement.

FIG. 6 illustrates a side view of the system, and more particularly a hinged-screen arrangement where all numerals correspond to those elements previously described. Here, the screen support member 42 is permanently attached to the hinge or pivot device 44, and fits snugly against the bottom of the computer housing 12 when it is stored as illustrated in dashed lines. It will be noted that the projection surface of the screen is on the outside and exposed in this case, and so a protective sleeve, or it can be a sheet (not shown) can be hinged across the bottom front of the computer to cover and protect the screen support member 42.

Figure 7:
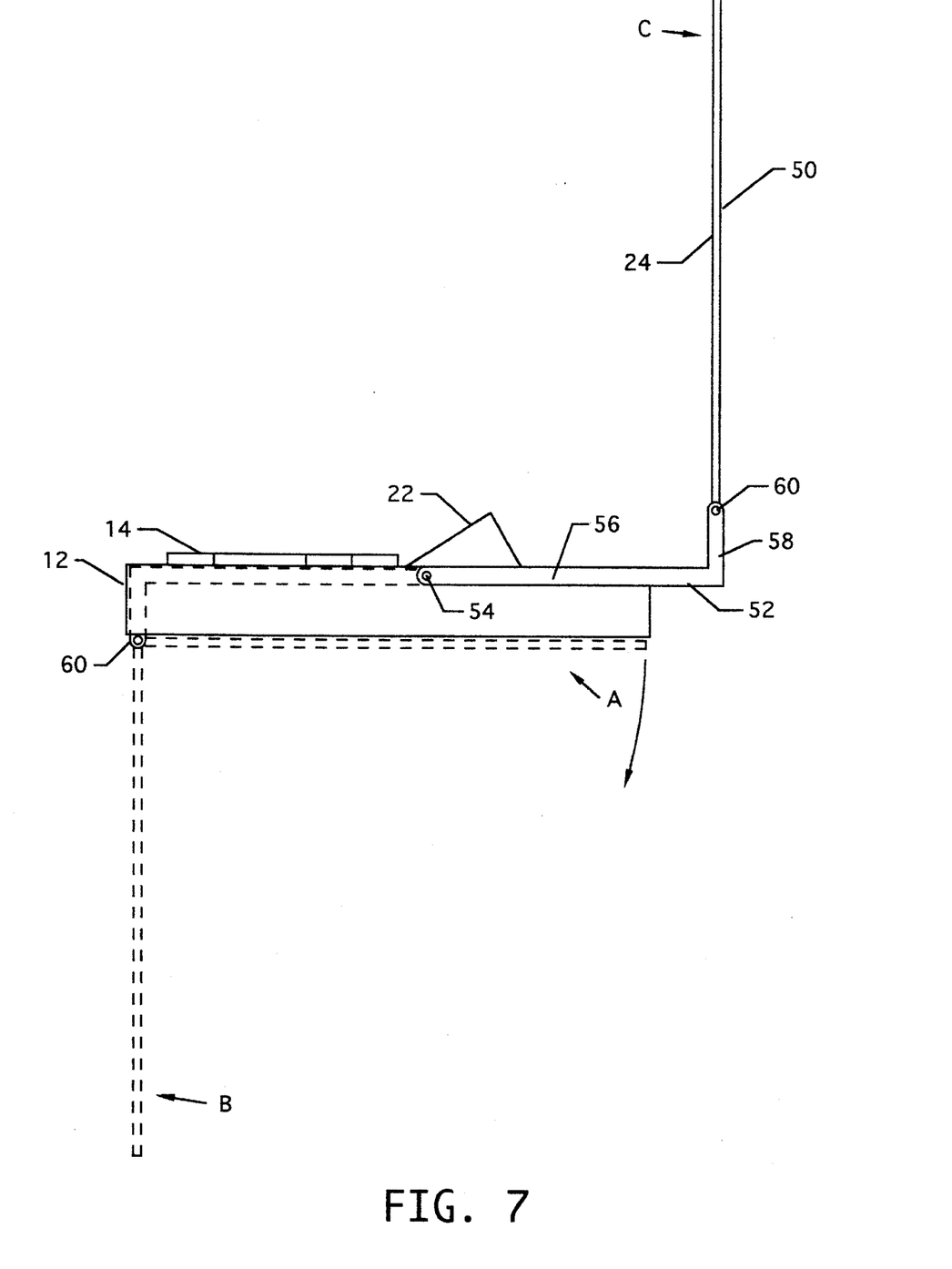
FIG. 7 illustrates side view of the computer including a projection screen stored against the computer case.

FIG. 7 illustrates a side view of the computer, and more particularly illustrates a projection screen support 50 which hinges about a hinged framework 52 where all numerals correspond to those elements previously described. An angled hinged framework 52 secures to the computer housing 12 via a pivot 54 and includes a long frame member 56 and a short integral frame extension 58 extending perpendicularly to the long frame member 56. The screen support member 50 attaches to the end of the short integral frame extension 58 at pivot point 60 and can pivot thereabout. Screen deployment is a two-step matter. From its stored position A, shown in dashed lines, the screen support member 50 is moved to the vertical position B by means of the pivot point 60, and then to its final position C by means of the second pivot 54. It is evident that by choice of the horizontal position of pivot 54 and of the length of its arms, one can design the vertical position of the deployed screen. A further optional feature of this arrangement is that the screen-folding arrangement can be designed to serve as the latch of the computer case.

Figure 8A:
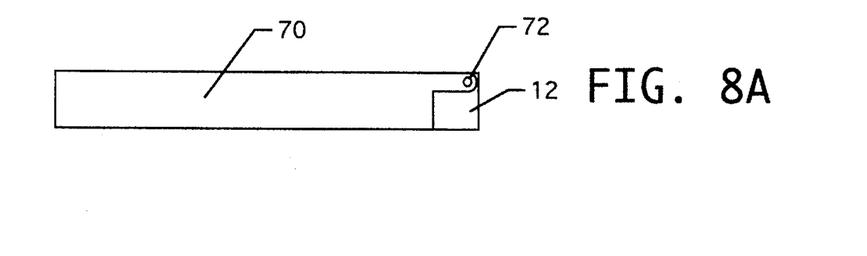
FIG. 8A illustrates a side view of the computer system in the carry mode.
Figure 8B:
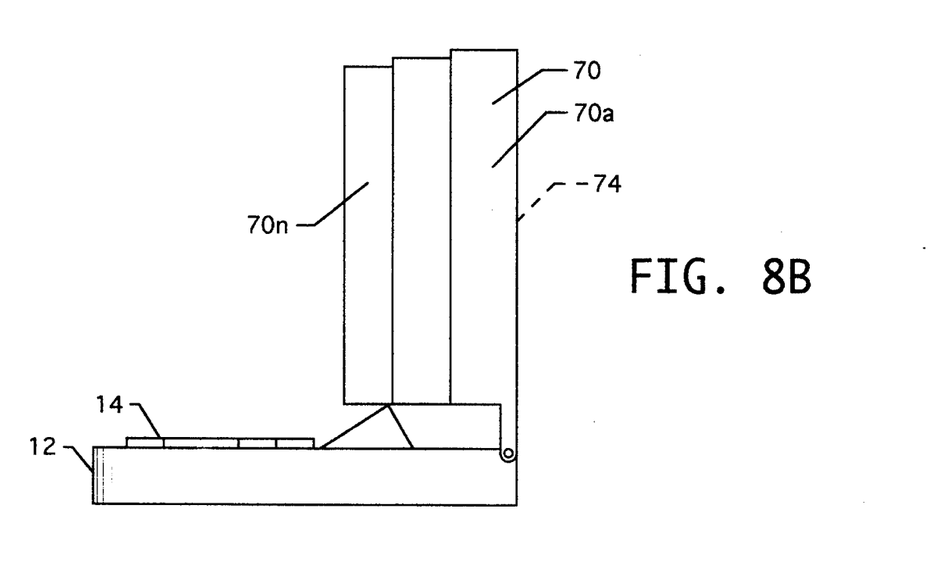
FIG. 8B illustrates a side view of the computer with the screen and telescoping shroud deployed; and, FIG. 8C illustrates a vertical cross-sectional view of the configuration of FIG. 8B.
Figure 8C:
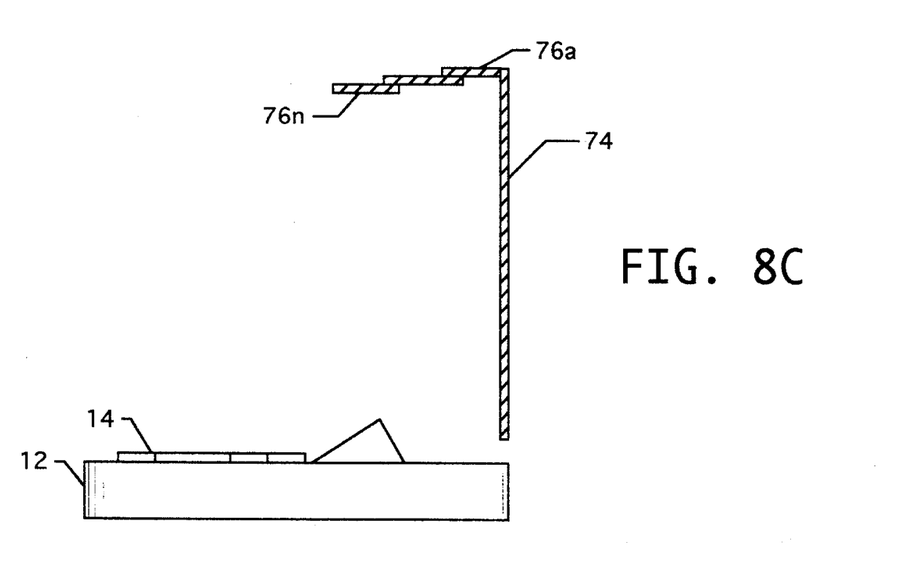

FIGS. 8A, 8B and 8C illustrate shrouding about the screen members where all numerals correspond to those elements previously described. Yet another option arises because the screen may on occasion require some shrouding, or protection from high ambient-light levels, as in outdoor daylight use of the computer. One way to achieve this shrouding is to employ the sides of the computer case, or members fitting inside or outside the sides of the computer case. The former option is illustrated in its carry mode in FIG. 8A, a side view of the computer system. An expandable shroud 70 secures to the computer housing 12 a pivot point 72 and pivots to a vertical position as illustrated in FIG. 8B.

FIG. 8B illustrates a side view of the computer with the screen and telescoping shroud deployed. The expandable shroud 70 includes a plurality of expandable members 70a–70n which expand forward over and about the screen 74.

FIG. 8C is a vertical cross-sectional view of the configuration depicted in FIG. 8B illustrating the plurality of top expandable shroud members 76a–76n about the top of the screen 74.

Various modifications can be made to the present invention without departing from the apparent scope hereof.

I claim:

1. A laptop computer or notebook computer comprising:
   a. a housing with a hinged display screen for displaying video images;
   b. a processing means in said housing;
   c. means for inputting information into said processing means; and,
   d. video projection means connected to said processing means and mounted on the housing for projecting processed information onto a front of the screen for visual viewing of said processed information.

2. A laptop computer or notebook computer comprising:
   a. a housing;
   b. a processing means in said housing;
   c. means for inputting information into said processing means; and, d. video projection means connected to said processing means for projecting video images of processed information onto a front of a video screen mounted on the housing for visual viewing of said processed information.

3. A laptop computer display system comprising:

a. a computer housing having a top surface;

b. a display movably mounted on said housing having a first position at an angle to the top surface, the display having a screen surface for displaying video image; and, c. video projection means mounted on the top surface of a housing for projecting computer information on the front of the screen.

4. The display system of claim 3 wherein the display is pivotally mounted from the first position to a second storage position.

5. The display system of claim 3 wherein a display is mounted in a slot in a top surface of the housing.

* * * * *